Oct. 12, 1965   R. A. NEAVERSON ETAL   3,211,307
LOADING AND UNLOADING APPARATUS FOR VEHICLES
Original Filed Aug. 30, 1961   3 Sheets-Sheet 1

ROWLAND ALEC NEAVERSON
PETER ANTHONY NEAVERSON
INVENTORS

Oct. 12, 1965  R. A. NEAVERSON ETAL  3,211,307
LOADING AND UNLOADING APPARATUS FOR VEHICLES
Original Filed Aug. 30, 1961  3 Sheets-Sheet 2

ROWLAND ALEC NEAVERSON
PETER ANTHONY NEAVERSON
INVENTORS

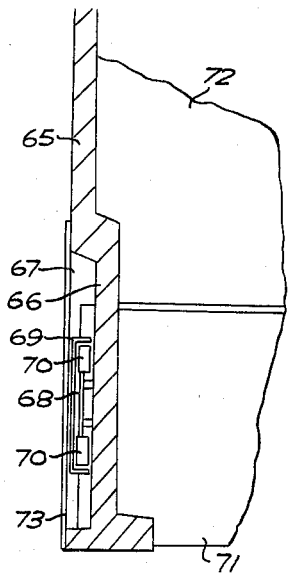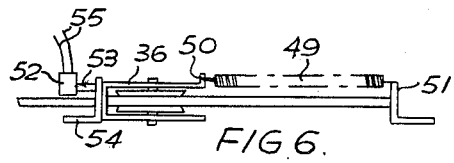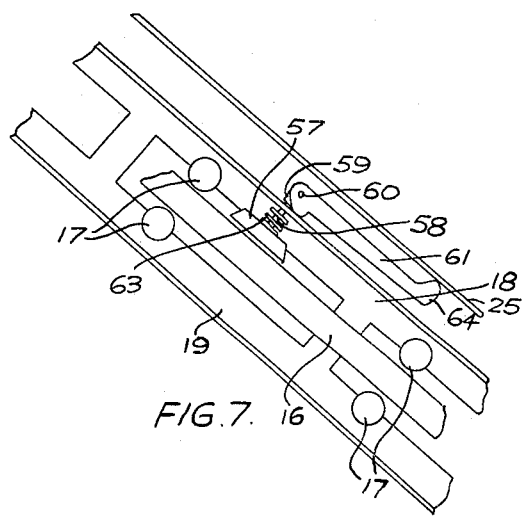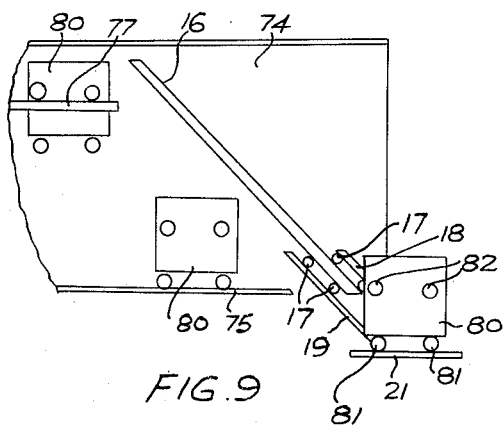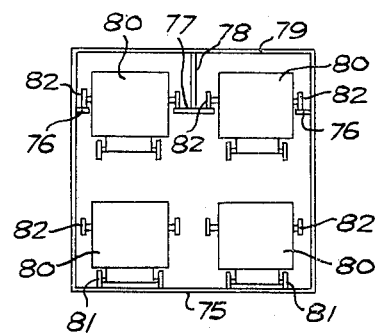

United States Patent Office 3,211,307
Patented Oct. 12, 1965

3,211,307
LOADING AND UNLOADING APPARATUS
FOR VEHICLES
Rowland Alec Neaverson, 49 Westfield Road, and Peter
Anthony Neaverson, 88 Curzon Ave., Birstall, both of
Leicester, England
Continuation of application Ser. No. 136,145, Aug. 30,
1961. This application Oct. 8, 1964, Ser. No. 402,571
Claims priority, application Great Britain, Sept. 7, 1960,
30,789/60
10 Claims. (Cl. 214—75)

The present application is a continuation of our application Serial No. 136,145, filed August 30, 1961, now abandoned.

This invention is for improvements in loading and unloading apparatus for vehicles and has for an object to provide a convenient, effective and compact apparatus for handling loads of vehicles.

In accordance with the invention there is provided loading and unloading apparatus for mounting on a goods vehicle and comprising a carrier for goods to be loaded or unloaded, parallel slanted slide arms supporting said carrier one at each side thereof, guiding means for the slide arms adapted to be mounted on the vehicle adjacent to a loading and unloading aperture and to guide said arms for endwise movement to move the carrier between a lowered position outside the vehicle and a raised position within the vehicle, and hoisting tackle coupled at each side of the carrier or said arms for raising and lowering the carrier. The hoisting tackle may be operated manually or by power means and is arranged to exert a pull in the general direction of the length of the slide arms. With a power operated arrangement there is preferably provided as an alternative manual operating means.

The carrier may be of skeleton form or in the form of a platform having a flat deck or a deck which is curved transversely to suit the type of load to be carried. When of skeleton form the carrier need only comprise two side bars or rails which may be separate from one another and maintained parallel by the guiding means acting on the slide arms. The hoisting means acting at each side of the carrier will be arranged to maintain the bars or rails or the sides of the platform at the same level. When in its fully lowered position the carrier is conveniently arranged to be resting on or in the neighborhood of the ground. The carrier when raised within the vehicle will be brought to the level of the floor thereof to form a continuation of such floor. It may also be capable of being raised to a higher level within the vehicle for the purpose of loading goods on a shelf or otherwise at such higher level. In the latter case the additional raising movement may occur on a continuation of the slantwise movement or arrangements may be made for the raising of the carrier above the level of the floor to occur vertically. For example the guiding means for the slide arms may be mounted within the overall length of the body in such manner as to provide for such vertical movement.

Certain preferred forms of construction in accordance with the invention are shown by way of example in the accompanying drawings and will now be described with reference to the drawings in which:

FIGURE 6 is a detail side view of a safety arrangement applied to the hoisting gear;

FIGURE 7 is a detail side view illustrating a mechanical safety device applied to the loading and unloading apparatus;

FIGURE 8 is a plan view in cross section of part of a vehicle body showing a modified form of the apparatus;

FIGURE 9 is a view corresponding to part of FIG. 2 but on a smaller scale showing somewhat diagrammatically a modified application of the invention; and FIGURE 10 is a rear view of the arrangement of FIG. 9.

Figure 1:
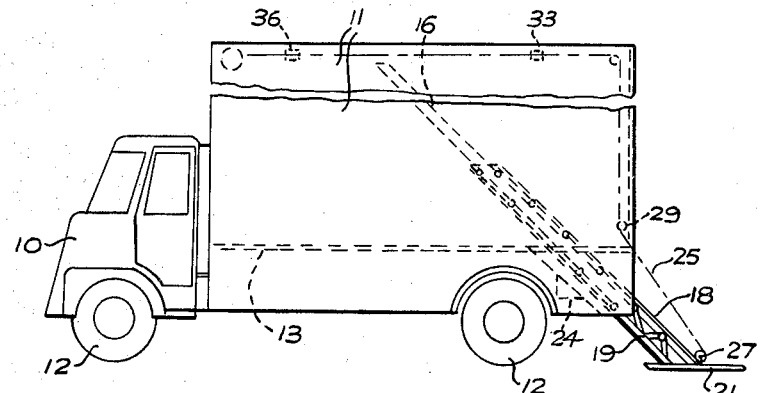
FIGURE 1 is a side elevation view, partly broken away, of a self propelled goods road vehicle fitted with the improved loading and unloading apparatus.
Figure 2:
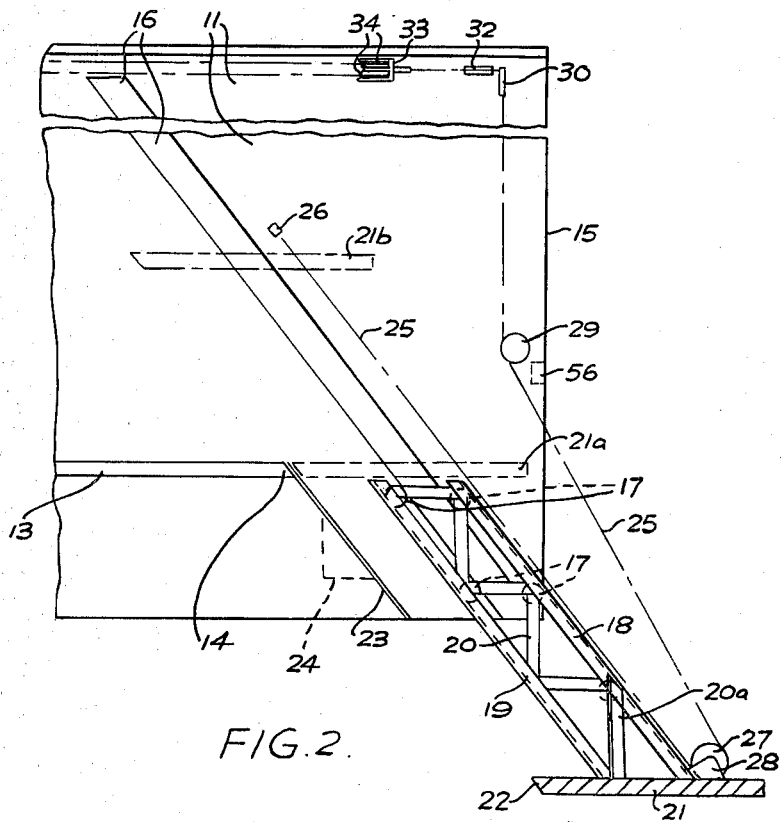
FIGURE 2 is an enlarged side elevation of certain rearward parts of the vehicle as seen in central cross section.

Referring firstly to FIGS. 1 and 2, the invention is shown as applied to a self propelled goods van having a driver's cab 10 and a body 11 and being supported on road wheels 12. The body 11 is shown as having a floor 13 which is stopped short at 14 forwardly of the rear end 15 of the body, the latter being fitted with a door or shutter, not shown, which can be opened to permit goods to be loaded and unloaded through said rear end. Fixed slantwise to the inner face of each side of the body 11 is a guideway 16 formed as a strip of sturdy metal plate inwardly offset from the side of the body and fixed thereto by spacing members. The guideways 16 at opposite sides of the body are parallel to one another and form tracks for rollers 17 which engage with the upper and lower sides of the tracks 16 and are mounted on slide arms formed by skeleton frames each comprising upper and lower longitudinals 18 and 19 of angle section connected by bracing straps 20 and a bracing member 20a of angle section. The slide arms formed by the frames 18, 19 at the two sides are secured rigidly to a carrier in the form of a deck or platform 21 which is of a size and shape to complete the rear end of the vehicle floor behind the rear edge 14 of the floor 13.

It will be seen from FIGS. 1 and 2 that the assembly comprising the frames 18, 19 and the carrier 21 is movable as a whole bodily up and down the guideways 16 to permit the carrier 21 to be lowered on to the ground immediately behind the rear of the body of the vehicle or raised to the level of the floor 13 or to a higher level if required. In FIGURE 2 the carrier 21 is shown in full lines in its fully lowered position and in chain lines at 21a and 21b in the raised positions. It will be noted that because of the slant movement of the carrier 21 its forward edge is bevelled or slanted as at 22 to enable it to fit reasonably closely up to the rear end 14 of the floor 13 which is correspondingly slanted. From the rear end 14 to the bottom part of the body there is provided also a slanted plate 23 which serves to enclose at the rear the parts under the floor 13 of the vehicle. This plate may be formed at positions spaced laterally or across its whole width with a stepped formation as indicated at 24 in the form of one or more steps, to assist ingress to the vehicle when the carrier 21 is lowered.

The control of the raising and lowering of the carrier 21 is effected by means of a rope or cable 25 on each side of the vehicle. Each cable 25 is anchored at 26 on to the upper part of the interior of the side of the body 11 and extends parallel to the guideway 16 to pass around a pulley 27 rotatably mounted on a pivot bracket 28 secured to the frame 18, 19 and the carrier 21. From the pulley 27 the cable 25 reaches upwardly to a guide pulley 29 on the side wall just forwardly of the rear of the vehicle, and thence to another guide pulley 30 just below the roof 31 of the body and pivoted on an axis extending longitudinally of the body, the cable then passing inwards to near the centre of the roof and around a further guide pulley 32 pivoted on a vertical axis. From the pulleys 32 the cables 25 extend forwardly to be connected to a sheave block 33, see particularly FIG. 3.

Figure 3:
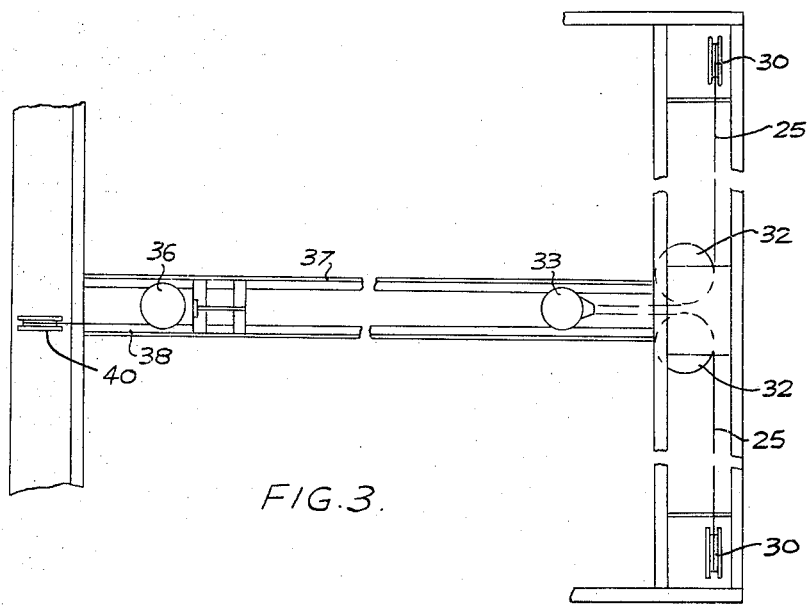
FIGURE 3 is a detail plan view on an enlarged scale and partly broken away showing the arrangement of part of the hoisting gear.
Figure 4:
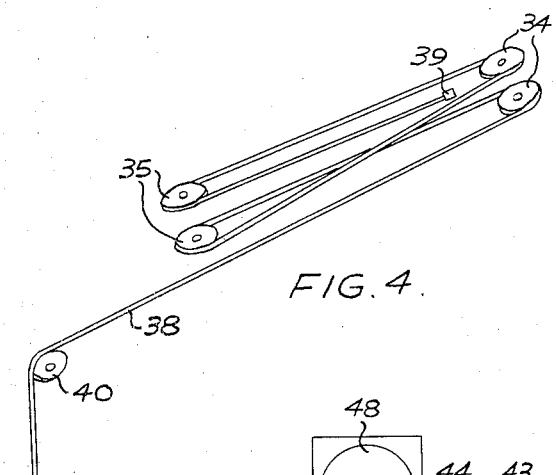
FIGURE 4 is a diagrammatic perspective view of certain parts of the hoisting gear.

It will be seen from FIGS. 2, 3 and 4 that the sheave block 33 carries two or more pulleys 34 corresponding to pulleys 35 on another sheave block 36 more forwardly positioned, under the center of the roof 31. The sheave blocks 33 and 36 are movably mounted for fore and aft sliding movement on supporting rails 37 mounted under the roof and are inter-connected by a hoisting cable 38 which has one end anchored at 39 to sheave block 33 and passes around rollers 35, 34, 35 and 34 in turn to extend forwardly and over a guide pulley 40 at the top of the forward end of the body. From pulley 40 the cable 38 passes down to a winding drum or winch driven preferably by an electric motor. Thus winding on of cable 38 draws the sheave block 33 forwardly along the guide rails 37 thereby taking up the cables 25 to raise the carrier 21.

Figure 5:
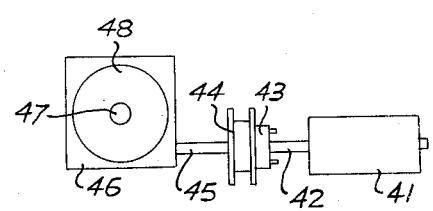
FIGURE 5 is a view illustrating a motor drive for the hoisting gear.

A preferred power unit for operating the cable 38 is shown in FIG. 5 which illustrates a reversible electric driving motor 41 having a shaft 42 serving to drive through a clutch 43 which slips on overload, a brake drum 44 of an automatic brake applied when the motor is stopped. The brake drum 44 is coupled to an input shaft 45 of a worm and worm wheel reduction gear 46, the output spindle 47 of which carries a winding drum 48 for the cable 38. Desirably the motor spindle 42 is also coupled to a hand crank by means of which the hoisting gear can be operated manually if required. A second motor may also be coupled to the spindle 42 to provide for alternative energization of the drive by different supply voltages. One motor may be arranged to be energized by the vehicle battery and the other by an appropriate means supply at a warehouse or other place at which the vehicle is being loaded or unloaded.

The arrangement of the sheave block 36 is such as to provide a safety and limiting control for the electric driving motor. As shown in FIG. 6 the sheave block 36 which is slidable along the rails 37 (FIG. 3) is acted on by a tension spring 49 connected between a lug 50 on the sheave block and a fixed transverse rail 51 secured to the forward end of the roof of the body 11. Associated with the sheave block 36 is a limit switch 52 having a plunger 53 engaging a short rail 54 on the sheave block 36. The limit switch has leads 55 connected appropriately in the circuit of the motor 41.

From the foregoing it will be understood that when the loading arrangement is in use on the vehicle the carrier deck 31 normally occupies the position 21a forming a rear continuation of the floor 13. When it is desired to load or unload the vehicle the rear doors are opened and for loading purposes the electric winch is operated to unwind the cable 38 and cause the carrier assembly to move downwardly and rearwardly by gravity until the carrier 21 rests on the ground as shown in FIG. 2. While the carrier assembly is above ground level its weight tensions the cables or ropes 25 drawing the sheave block 33 rearwardly and tensioning the cable 38 so that the sheave block 36 is also drawn rearwardly against the action of spring 49. This causes the sheave block 36 to operate the plunger 53 and limit switch 52 so as to energize the switch and allow the motor to operate. When the carrier deck 21 engages the ground and tension in the cables or ropes 25 and in the cable 38 becomes released and the spring 49 can then withdraw the sheave block 36 from the limit switch 52 and thereby cause disconnection of the motor circuit so that the motor is stopped and a brake shoe automatically applied to the brake drum 44. Limit switch 52 thus serves also as a protection to stop the motor 41 whenever the cables 25 and 38 become slack as for instance if some hindrance should prevent lowering of the deck 21. In either circumstance the switch 52 will cause prompt stoppage of the motor and prevent over-running of the winch and any possibility of reverse winding of the cable 38 on to the winding drum 48.

To load the vehicle goods are then wheeled to the deck 21 and the motor started in the direction to wind on the cable 38 so as to lift the deck in the forwardly and upwardly slanting direction along the guideways 16 until it is brought to the required level within the body of the vehicle which may be, for example, at level 21a at which the goods can be moved forwardly off the deck 21 on to the vehicle floor 13. Alternatively it may be an upper level as at 21b at which goods from the deck 21 can be moved forwardly to stack them on top of other goods or on to an upper shelf in the vehicle body. The positioning of the carrier at levels 21a and 21b is obtained by limit switches actuated by the deck 21 or one of its slide arms to stop the motor and apply the brake to the winch as the required level is being approached. The control of the raising and lowering movements of the deck may be effected manually by a push button or gated lever switch mechanism indicated diagrammatically at 56 in FIG. 2 and associated with electric control gear for the motor of orthodox type similar to that used for lift control.

As a safeguard against the hoisting mechanism being accidentally operated when the rear doors of the vehicle are closed isolating switches may be provided for disconnecting the motor circuit except when the doors are fully open.

A mechanical safety arrangement associated with the slide arm frames 18, 19 at the two sides of the vehicle is preferably provided to arrest or retard downward movement of the carrier or one side only thereof in the event of one or both of its hoisting ropes or cables 25 becoming loose or fracturing. Such a safety arrangement is illustrated somewhat diagrammatically in FIG. 7. Thus the upper longitudinal 18 of each slide arm assembly is shown as being fitted with a brake block 57 attached to a slide bar 58 which passes through an aperture in the angle flange or member 18 and has an enlarged upper end 59 to which is pivoted at 60 a cam lever 61 having a cam lobe 62. The bar 58 at its lower part is fitted with a compression spring 63 serving to urge the brake block 57 in the direction to engage the upper side edge of guideway 16. The free end of cam lever 61 has an enlargement 64 which is preferably grooved to engage against the rope or cable 25 along that stretch thereof which extends from pulley 27 (FIG. 2) to the fixed anchorage 26. When the cable 25 is taut it pressed on the end of lever 61 so as to pass it downwardly and by engagement of the cam lobe 62 with the flange of member 18 the slide bar 58 is caused to be raised to lift the brake block 57 away from the guideway 16. Should the cable 25 fracture or become loose the spring 63 is immediately permitted to press the brake block 57 firmly against the guideway 16 since the lever 61 is freed to rock upwardly and permit this action to occur. Lowering movement of the deck 21 at one or both sides is thereby arrested by one or both of the brake blocks 57.

FIGURE 8 illustrates in sectional plan view the rear part of one side of a vehicle body, showing a modification wherein the loading apparatus is applied to an insulating body of a vehicle. A portion of one side only of the body is shown and, at each side, the side wall indicated at 65 is offset inwardly as at 66 to provide an exterior recess 67 in which the guideway and appropriate carrier slide arm shown respectively at 68 and 69 are housed, the guideway 68 being fixed to the inwardly offset part 66 of the body at a spacing outwardly therefrom, and the slide arm being fitted with rollers 70 to run on the guideways 68. The deck of the carrier is shown at 71 and has the carrier arms 69 attached to it at its sides. The deck 71 in the raised position can be made to fit with a close seal against the rear edge of the fixed floor, indicated at 72, of the vehicle body and with the undersides of the inwardly offset portions 66 of the body sides 65. To provide a neat flush finish externally the recess 67 is preferably covered by a removable panel 73. The hoisting mechanism of the construction of FIG. 8 corresponds to that described with reference to FIGS. 1 to 7.

FIGS. 9 and 10 illustrate diagrammatically a further modification in which the improved apparatus is applied to a vehicle adapted for transportation of skips or containers. In this example part of a vehicle body is shown diagrammatically at 74 and it is fitted with a fixed floor 75 as well as load carrying side ledges 76 and a corresponding central upper ledge 77 suspended by a hanger or hangers 78 from the roof 79 of the body. As in the construction of FIGS. 1 and 2 the floor terminates forwardly of the rear end of the vehicle to accommodate the removable carrier deck 21 which forms a rearward continuation to it when positioned at that level and the body is fitted with forwardly and upwardly slanting guideways 16 on which rollers 17 of the slide arms 18, 19 of the carrier run. The vehicle is adapted for transporting wheeled containers as shown at 80 running on wheels 81 and having fitted at the upper parts of their sides rollers 82 which are capable of tracking on the ledges 76 and 77. Thus two of the containers 18 may be wheeled side by side on to the lowered deck 21 and the deck then raised in the manner previously described either to the level of the floor 75 to enable the containers to be wheeled on to the latter forwardly of the body, or to an upper level at which the containers are transferred forwardly to cause their side rollers 82 to run on the ledges 76 and 77 to accommodate the containers at an upper level. The ledges 76 and 77 are of course terminated slightly forwardly of the guideways 16 and at such a position that the rollers 82 will run on to their rear ends before the wheels 81 below them can leave the carrier 21.

Various modifications are possible to the construction as described in the drawings. If desired the carrier may be fitted with shock absorbers beneath it to engage with the ground and prevent undesired vibration as the carrier reaches its lowered position. Further the apparatus as illustrated is capable of being fitted to an open lorry by providing suitable supporting posts at the sides thereof to support the guideways 16. Instead of providing an electric motor as the power means for operating the hoisting gear a hydraulic motor or internal combustion engine may be used to supply such power. In the latter case the engine driving the vehicle may be used to operate the hoisting gear. Instead of the hoisting gear described in the foregoing examples various alternative ways of operating the carrier may be used. For example it may be operated by hydraulic, compressed air or vacuum rams or any combination thereof with or without the incorporation of wire ropes.

Other alternative ways of mounting the carrier are readily possible apart from the preferred construction shown. Thus the slide arms 18, 19 need not carry rollers but may be arranged to engage directly or through fitted rails between sets of rollers mounted on the sides of the vehicle to form the guiding means, the rollers at each side being arranged in two parallel rows inclined upwardly and forwardly along the lines of the guideways 16. The rollers are preferably mounted on anti-friction bearings. Alternatively the guides for the slide arms may take the form of recessed slide blocks faced with anti-friction material, or any other desired form.

The invention may be applied to use in various ways to assist rapid and convenient loading of vehicles with goods of various kinds. For example the carrier when lowered may be arranged to register with the delivery end of a roller type conveyor at a goods loading point, and when raised into the vehicle body may register with a similar conveyor or conveyors provided within the vehicle. Thus heavy goods can be loaded and unloaded expeditiously and with great economy of manual effort. Further the carrier, particularly when of skeleton form above mentioned may be adapted to receive pallets of flat or box type loaded with goods for transfer into or out of a vehicle onto or away from pallet supports, for example rails, ledges or pallet racks fitted in vehicles.

What we claim is:

1. In combination, a vehicle body including sides and loading and unloading apparatus therefor, said vehicle body having a floor terminating short of the loading and unloading end of said vehicle body, a carrier movable in an inclined path from a position within the vehicle body where it forms a continuation of said floor to a position downwardly and outwardly of said body adjacent ground level, means for mounting said carrier for movement along said path, which means includes extended guideways supported within the vehicle body against the sides thereof, and means for effecting such movement of said carrier.

2. The combination of claim 1 in which the guideways of the first named means are mounted slantwise in the vehicle body and the second named means includes parallel slanted braced frames provided at the sides of the carrier and having rollers engaging said guideways.

3. The combination of claim 1 in which the carrier moving means is constructed and arranged to bring the carrier to rest at the level of the vehicle body floor as a continuation of said floor and also adjacent ground level.

4. Loading and unloading apparatus for a goods vehicle having a vehicle body with a floor terminating short of its loading and unloading end, said apparatus comprising a pairs of slantwise guideways mounted in the vehicle body on the inner surfaces of the sides thereof, a similarly slanted pair of frames engaging and movable in opposite directions along said guideways, a carrier to which the lower ends of the frames are secured, and means for moving said frames along said guideways to raise said carrier to a position where it forms a level continuation of said floor and to a position adjacent ground level.

5. Apparatus according to claim 4 in which the size and shape of the carrier are such as to complete said floor, the contiguous edge of the carrier and floor being complementarily bevelled to form a close fit.

6. Apparatus according to claim 4 wherein the guideway and carrier moving means are constructed for movement of the carrier to a position above the said floor and within the vehicle body, and stop means for positioning and holding the carrier at an upper loading level above said floor.

7. In combination, a vehicle body and loading and unloading apparatus therefor, said vehicle body having a floor terminating short of the loading and unloading end of said vehicle body, a platform carrier, extended slanted means for guiding said carrier in an inclined path from a position within the vehicle body where it forms a smooth continuation of said floor to a position downwardly and outwardly of said body adjacent ground level, hoisting means disposed at least largely within the vehicle body for effecting movement of said carrier along said inclined path and means for controlling the operation of said hoisting means.

8. The combination of claim 7 wherein the hoisting means includes cables coupled respectively to the opposite sides of said carrier and operable simultaneously for raising and lowering movement of the carrier.

9. The combination of claim 7 wherein the guiding means for the carrier extends upwardly nearly to the roof of the vehicle body to permit the carrier to be raised to a loading position above the level of the vehicle floor and forwardly of the loading and unloading end of the vehicle body and the controlling means for the hoisting means is operable to raise the carrier to said upper forward loading position.

10. The combination of claim 7 wherein the vehicle body comprises a roof portion and the hoisting means comprises cables acting respectively on opposite sides of the carrier, means guiding said cables along the roof of the body to a part thereof remote from the loading and unloading end of the body, and winder means for winding the cables at their remote ends.

References Cited by the Examiner
UNITED STATES PATENTS

| | | | |
|---|---|---|---|
| 1,338,127 | 4/20 | Felt | 187—10 |
| 2,521,727 | 9/50 | Kappen | 214—518 |
| 2,538,517 | 1/51 | Hayden. | |
| 2,581,333 | 1/52 | Vawter. | |
| 2,581,887 | 1/52 | Saxton et al. | 187—12 |
| 2,752,052 | 6/56 | Trotter et al. | |
| 2,819,810 | 1/58 | De Witt | 214—516 |
| 2,843,277 | 7/58 | Brannan. | |
| 2,873,868 | 2/59 | Kringlen. | |

GERALD M. FORLENZA, *Primary Examiner.*

HUGO O. SCHULZ, *Examiner.*